United States Patent
Wusterbarth et al.

(10) Patent No.: US 12,460,957 B2
(45) Date of Patent: Nov. 4, 2025

(54) ACOUSTIC RAIL FOR CLAMP ON ULTRASONIC FLOW METER

(71) Applicant: Badger Meter, Inc., Milwaukee, WI (US)

(72) Inventors: Michael A. Wusterbarth, Greenfield, WI (US); David Leckman, Naperville, IL (US); Paul W. Eserkaln, Oak Creek, WI (US); Robert M. Herriges, West Allis, WI (US); Douglas W. Koehn, Waterford, WI (US)

(73) Assignee: Badger Meter, Inc., Milwaukee, WI (US)

(*) Notice: Subject to any disclaimer, the term of this patent is extended or adjusted under 35 U.S.C. 154(b) by 430 days.

(21) Appl. No.: 18/182,931

(22) Filed: Mar. 13, 2023

(65) Prior Publication Data
US 2024/0310197 A1    Sep. 19, 2024

(51) Int. Cl.
*G01F 1/667*  (2022.01)
*G01F 1/66*   (2022.01)

(52) U.S. Cl.
CPC .............. *G01F 1/667* (2013.01); *G01F 1/662* (2013.01)

(58) Field of Classification Search
CPC ................................. G01F 1/667; G01F 1/662
USPC ....................................................... 73/861.28
See application file for complete search history.

(56) References Cited

U.S. PATENT DOCUMENTS

| | | | |
|---|---|---|---|
| 4,425,803 A | 1/1984 | Baumoel | |
| 6,681,641 B2 | 1/2004 | Baumoel | |
| 8,978,476 B2 | 3/2015 | Ao et al. | |
| 9,389,109 B2 | 7/2016 | Gledhill, III et al. | |
| 9,494,454 B2 | 11/2016 | Baumoel | |
| 9,689,727 B2 | 6/2017 | Kissling et al. | |
| 2011/0271769 A1* | 11/2011 | Kippersund | G01F 1/86 73/861.28 |
| 2015/0260556 A1* | 9/2015 | Schaefer | G01F 1/667 73/861.28 |
| 2019/0226862 A1 | 7/2019 | Shaukat et al. | |

FOREIGN PATENT DOCUMENTS

DE    102007062913 A1 *  6/2009  ............. G01F 1/662
WO       2014021846 A1    2/2014

OTHER PUBLICATIONS

Translation of DE-102007062913-A1 (Year: 2009).*

* cited by examiner

*Primary Examiner* — Nathaniel T Woodward
(74) *Attorney, Agent, or Firm* — Boyle Fredrickson SC

(57) ABSTRACT

An ultrasonic flow meter configured to measure a flow within a conduit is described. The flow meter includes first and second transducers configured to transmit acoustic signals in forward and reverse direction as fluid flow signals along a fluid flow signal path through a fluid within the conduit, an acoustic rail extending between the first and second transducers configured to receive the transmitted acoustic signals for transmission as acoustic rail signals in forward and reverse direction along an acoustic rail signal path along the acoustic rail, a printed circuit board including circuitry for conducting ultrasonic transit time flow measurements and a programmable processor included on the printed circuit board that is configured to generate flow measurement data using the fluid flow signals and the acoustic rail signals. The acoustic rail being isolated from the conduit.

20 Claims, 5 Drawing Sheets

ACOUSTIC RAIL FOR CLAMP ON ULTRASONIC FLOW METER

FIELD OF THE INVENTION

This application relates to an ultrasonic flow meter configured to calculate the amount of flow through a conduit. More particularly, the present application related to an ultrasonic meter configured to have improved accuracy using a second ultrasonic signal measurement.

BACKGROUND

An ultrasonic flow meter uses sound waves to determine the velocity of a fluid or gas travelling through a conduit. For expediency, the present application will refer to a fluid, but one or ordinary skill in the art would understand that the principles are similar for gases. The flow meter includes two or more transducers that send and receive ultrasonic signals forward (with the direction of the flowing fluid) and backward (against the direction of the flowing fluid). When fluid is flowing through the conduit, the backward signal will travel slower and take more time than the forward signal. When the fluid moves faster, the difference between the forward and backward signal times increases.

However, ultrasonic meter accuracy may be affected by ambient temperatures, fluid temperature, calibration, drift, variability in the fluid travelling through the conduit, etc. These issues may be particularly prevalent in clamp on ultrasonic flow meters that also have variation in types of conduits, quality of attachment, etc. Clamp-on transducers are especially useful when piping cannot be disturbed, such as in power and nuclear industry applications. In addition, clamp-on transducers can be used to measure flow without regard to materials of construction, corrosion, and abrasion issues. However attractive, the use of clamp-on transducers introduces additional ultrasonic interfaces that can affect the reliability and performance of these flow meters. If not properly applied and maintained, attenuation of the ultrasonic signal can occur at the interfaces between the clamp-on transducers and the outside conduit walls, and between the inside conduit walls and the fluid. To attempt to counter these variables, some ultrasonic flow meters are configured to send a second ultrasonic signal through the wall of the conduit, parallel to the flowing fluid, to provide a control signal transmitted using more controlled conditions. The control signal may then be used to improve the accuracy of the measurement signal.

However, although transmitting a control signal through the conduit wall removes a number of variables associated with transmitting the signal through fluid in the conduit, such conduit wall transmissions also introduce new variables. For example, variances in the type of conduit, the thickness of the conduit wall, imperfections in the conduit wall, etc. can all affect the accuracy of the measurement. Additionally, the variations in the temperature of the fluid in the conduit can change the temperature of the conduit wall which will also affect the control signal.

What is needed is an ultrasonic signal flow meter configured to be able to send and receive a control signal that is less subject to variation. What is further needed is such an ultrasonic flow meter configured to generate a control signal that is substantially unaffected by fluid flow.

SUMMARY OF THE INVENTION

The present application is directed to an ultrasonic flow meter including an acoustic rail that is isolated from the conduit and fluid or gas being metered. Advantageously, isolation of the acoustic rail allows for more accurate meter calibration (zeroing) and may also be used in determining one or more fluid properties, such as density and fluid mixture.

The present invention is directed to an ultrasonic flow meter configured to measure a flow within a conduit is described. The flow meter includes first and second transducers configured to transmit acoustic signals in forward and reverse direction as fluid flow signals along a fluid flow signal path through a fluid within the conduit, an acoustic rail extending between the first and second transducers configured to receive the transmitted acoustic signals for transmission as acoustic rail signals in forward and reverse direction along an acoustic rail signal path along the acoustic rail, a printed circuit board including circuitry for conducting ultrasonic transit time flow measurements and a programmable processor included on the printed circuit board that is configured to generate flow measurement data using the fluid flow signals and the acoustic rail signals. The acoustic rail being isolated from the conduit.

In one more detailed aspect, the first and second transducers are further configured to transmit acoustic signals in forward and reverse direction as conduit wall signals along a conduit signal path through a wall of the conduit. In another more detailed aspect, the programmable processor is configured to generate flow measurement data using the fluid flow signals, the conduit wall signals and the acoustic rail signals. In yet another more detailed aspect, the acoustic rail is configured to include at least two different materials, each material defining a separate acoustic rail signal path.

In another embodiment of the invention, the acoustic rail includes a rail wall filled with fluid. The fluid may be water in an exemplary embodiment. Additionally, the water may be treated with at least one of an anti-freezing agent, a preservative agent, and a antibacterial agent.

In another embodiment, the acoustic rail is isolated from the conduit by an air gap. The acoustic rail may be isolated from the conduit by a dampener providing acoustic and temperature isolation. The programmable processor may be configured to calibrate the flow meter using the acoustic rail signal, the conduit wall signal and the fluid flow signal. This programmable processor may also be configured to monitor the flow rate to identify a steady, non-zero flow rate prior to initiating flow meter calibration.

In another more detailed aspect, a computer-implemented method for measuring a flow within a conduit using an ultrasonic flow meter is described. The method includes the steps of transmitting acoustic signals in forward and reverse direction as fluid flow signals along a fluid flow signal path through a fluid within the conduit using a first and a second transducer, transmitting acoustic signals for transmission as acoustic rail signals in forward and reverse direction along an acoustic rail signal path along an acoustic rail extending between the first and second transducers, conducting ultrasonic transit time flow measurements at a printed circuit board including circuitry, and generating flow measurement data using the fluid flow signals and the acoustic rail signals at a programmable processor included on the printed circuit board. The acoustic rail is isolated from the conduit.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

Figure 1B:
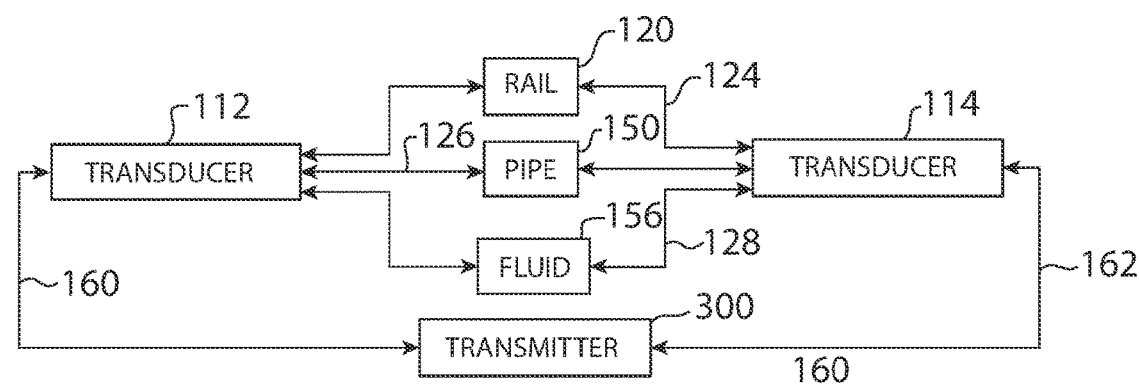
FIGS. 1A and 1B are a simplified illustration of an ultrasonic flow meter assembly, shown in a cross-section view, and a communication map for the assembly, according to an exemplary embodiment.
Figure 1A:
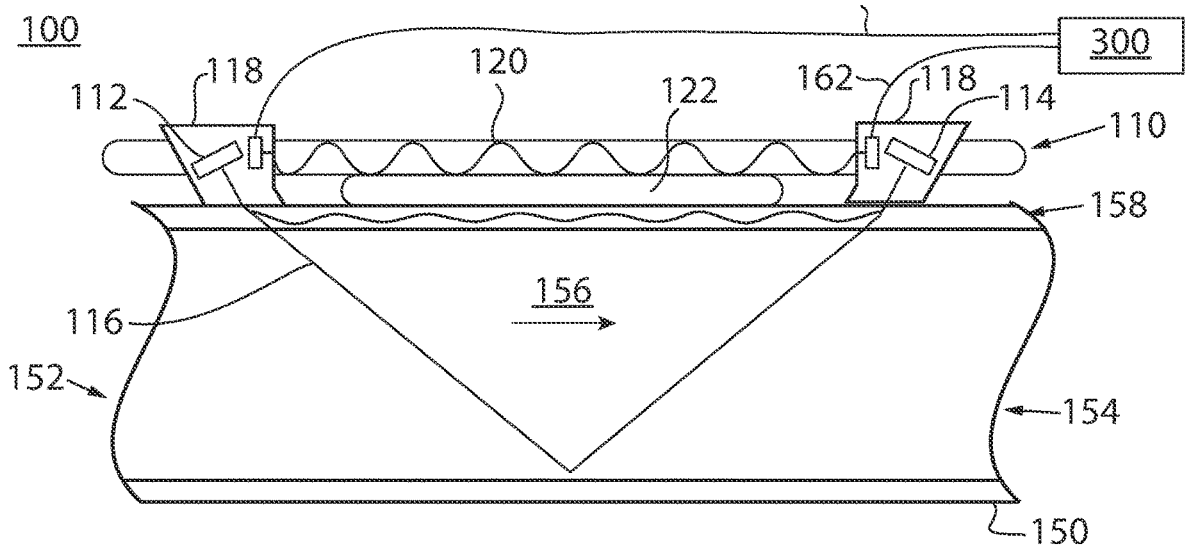

Referring first to FIG. 1A, a simplified illustration of an ultrasonic flow meter monitored assembly 100 is shown in a cross-section view, according to an exemplary embodiment. The ultrasonic flow meter monitored assembly 100 includes an ultrasonic flow meter 110, a conduit 150, and a flow measurement computer 300. Flow measurement computer 300 is shown and further described below with reference to FIG. 3. Although a specific configuration of an ultrasonic flow meter monitored assembly 100 is shown and described herein, one of ordinary skill in the art should understand that the invention described herein may be applied to any ultrasonic flow meter monitoring assembly configurable to use the acoustic rail described herein.

Ultrasonic flow meter 110 may be a solid state, ultrasonic measurement system configured to measure and report flow of a fluid or gas through the conduit 150 between walls 158 of the conduit 150. Ultrasonic flow meter 110 may be configured to be totally encapsulated, weatherproof and UV-resistant within a flow meter housing. Ultrasonic flow meter 110 may be coupled to conduit 150 using clamps, adhesives, etc. In an alternative embodiment, the flow meter housing of ultrasonic flow meter 110 is integrally formed with conduit 150 during manufacturing.

Ultrasonic flow meter 110 includes first and second transducers 112 and 114, respectively, positioned at a known distance apart along conduit 150. Transducers 112 may be piezoelectric transducers, solenoid transducers, etc. Ultrasonic flow meter 110 further includes an acoustic rail 120 isolated from the conduit 150. According to exemplary embodiments, the first and second transducers 112, 114 may be selected based on the configuration of the housings, transducer(s) and acoustic rail.

An ultrasound measurement path 116 is depicted to represent an ultrasonic signal path between transducers 112 and 114 through a flow 156 travelling through conduit 150. In the example shown, the measurement path includes a single reflection point between the transducers. However, one of ordinary skill in the art would understand that the measurement path may alternatively be configured to include zero or a plurality of reflection points between the transducers 112 and 114 dependent on the size of the conduit 150 and a desired length of the ultrasonic measurement path. Although only first and second transducers 112, 114 are shown, flow meter 110 may include a plurality of transducers and transducer assemblies in alternative embodiments and as described hereinbelow.

Transducers 112 and 114 may be housed in one or more housings 118. The transducer housing 118 may be the housing for a clamp on ultrasonic flow meter, may be integrated with conduit 150, etc. Each housing 118 may be generally configured to position the transducers such that when the transducers emit ultrasonic signals to travel along the ultrasonic signal path 116, the transmitted signal passes through the flow 156 in conduit 150 and is received by the opposing transducer. Acoustic rail 120 may be configured to extend between first and second housings 118, housing transducer 112 and 114, respectively. Flow measurement computer 300 may be housed with the housing 118 or connected to the housings 118 via one or more communication cables 160, 162 as shown in FIG. 1A.

In an alternative embodiment, flow meter 110 may include a single housing 118 encapsulating transducers 112, 114 that is configured based on the size on conduit 150. In this embodiment, housing 118 may further be configured to encapsulate the acoustic rail 120. Advantageously, such an enclosure insulates the acoustic rail 120 against external temperature effects in addition to isolating the acoustic rail from conduit 150. Yet further, such a single housing 118 can be used to insulate all of the components of the flow meter 110 to allow for a uniform temperature and minimize variation.

First transducer 112 is connected to flow measurement computer 300 by a first transducer cable 160. Second transducer 114 is connected to flow measurement computer 300 by a second transducer cable 162. Transducer cables 160 and 162 may be any type of cabling configured to facilitate sending and receiving electronic signals between first and second transducers 112 and 114 and flow measurement computer 300.

As fluid and/or gas flows into the conduit 150, through an upstream end 152, ultrasonic signals are sent consecutively in forward and reverse directions through the flow prior to the fluid or gas exiting the conduit 150 through a downstream end 154. Velocity of the fluid or gas is then determined by measuring the time difference between the measurement in the forward and reverse directions.

Flow meter 110 may further include additional sensors such as a temperature sensor, a pressure sensor, a backflow sensor, etc. Total flow volume may then be calculated from the measured flow velocity using additional information such as temperature, conduit diameter of conduit 150, etc.

The measured and calculated values, including the flow rate, may be converted to electrical pulses which are counted as units of consumption of a fluid or gas. These signals may then be transmitted by an internal radio transceiver or through a cable to an external radio transceiver or other system. The radio transceiver typically includes a radio transmitter portion and a radio receiver portion. The radio transmitter portion converts the measurement system signals to a radio frequency signaling protocol for transmission back to a network data collector through a wireless network.

Acoustic rail 120 is a rail extending between a housing 118 for first transducer 112 and a housing 118 from second transducer 114. The acoustic rail 120 may be made from a polymer material to facilitate the transmission of the acoustic signal through the rail. The acoustic rail 120 and first and/or second transducers 112 and 114 may include an acoustic gel, grease and/or coupling pad to provide an acoustic interface between the rail and transducers.

Advantageously, using an ultrasonic flow meter 110 including an acoustic rail 120, variation in the spacing between transducers 112 and 114 is more tolerant such that careful placement is not required. Using the described flow meter 110, accurate spacing can be calculated by flow measurement computer 300 in situ. The flow meter 110 including the acoustic rail 120 can tolerate and detect differences in spacing due to improper installation and/or installation constraints. Without the acoustic rail 120, the system 100 relies completely on an accurate spacing setup during installation.

In an alternative embodiment, acoustic rail 120 is filled with a liquid. In an exemplary embodiment, the liquid is water, although other liquids may be used since speed of sound in liquids tends to depend on temperature and such dependence can be a known value. A water filled acoustic rail 120 has the ideal temperature and speed of sound dependence for calculating spacing and temperature of the system. Advantageously, water has a well-established relationship between temperature and speed of sound, with a more pronounced temperature dependence on speed of sound than polymers. In additional alternative embodiments, the liquid within the acoustic rail 120 can be treated with additives having anti-freeze, preservation, or antibacterial properties. Temperature can be more accurately transduced when the speed of sound will vary greatly dependent on the temperature change of the material along which the acoustic signal is transmitted.

In another alternative embodiment, acoustic rail 120 may be configured such that the length of the acoustic rail 120 is greater than the spacing between transducers 112 and 114. For example, acoustic rail 120 may include one or more curvatures, such as being formed in an "S" shape to increase the length of the acoustic rail while still fitting between transducers 112 and 114. Advantageously, increasing the length of the acoustic rail 120 increases the distance that the acoustic rail signal travels along the acoustic rail 120, increasing the accuracy of the calculations described herein.

Referring now also to FIG. 1B, acoustic rail 120 is configured to receive an acoustic rail signal 124 transmitted between first transducer 112 and second transducer 114 in forward and reverse direction along acoustic rail 120 concurrently with transmission of a fluid flow signal 128 between first transducer 112 and second transducer 114 in forward and reverse direction through the fluid flow 156 and a conduit wall signal 126 between first transducer 112 and second transducer 114 in forward and reverse direction through the conduit wall 152. The acoustic signals are sent sequentially, alternating upstream and downstream. One transducer is set to "listen" while the other transmits. The flow measurement computer 300 can distinguish between fluid wave, conduit wave, and acoustic rail wave based on the timing of acoustic signal receipt. The conduit wall signal 126 and acoustic rail signal 124 always take less transit time than the fluid flow signal 128.

Advantageously, using an acoustic rail 120, the rail may be manufactured such that there is little to no variability in the size, shape or composition of the acoustic rail. This stability provides greater consistency in transmission times for acoustic rail signals in comparison to transmission time for conduit wall signals in various sizes, shapes and composition of conduits 150 and conduit walls 158. Accordingly, an ultrasonic flow meter 110 including an acoustic rail 120 can be used on conduits 150 having any material composition, dimensions and/or composition variations. Specifically, such an ultrasonic flow meter 110 can be used with plastic conduits, which may distort the acoustic rail signal and thus cannot reliably use traditional transmission of a conduit wall signal through the conduit wall.

The acoustic rail 120 further facilitates a more accurate determination of the speed of sound in the process fluid travelling through flow 156. Specifically, the acoustic rail 120 and the conduit section transmitting the conduit wave will have the same length, as shown in FIG. 1A. The acoustic rail 120 and the conduit section transmitting the conduit wave will also have a known speed of sound to temperature relationship. Therefore, applying simple equations for speed of sound, temperature, and distance, both upstream and downstream transit time measurements are used to solve for the speed of sound in the rail and the spacing of the conduit.

Acoustic rail isolation 122 is configured to acoustically isolate the acoustic rail 120 from the wall 158 of the conduit 150. Acoustic rail isolation 122 may be an air gap, a layer of polystyrene or other dampening material that provides an acoustic and temperature dampener between the conduit 150 and acoustic rail 120.

Isolating the acoustic rail 120 using the acoustic rail isolation 122 ensures that the acoustic rail 120 will maintain a more consistent temperature, leading to more consistency in performance as a transmission path for the acoustic rail signal 124. The isolation of the acoustic rail from the conduit can be accomplished with an air gap or a liner with a high absorption coefficient or sufficiently different acoustic impedance from the conduit and rail acoustic impedances to cause near perfect reflection of ultrasonic waves.

In operation, flow measurement computer 300 may be configured to utilize three travel times for the rail, conduit, and fluid are used in the calculations of conduit spacing, temperature, and fluid speed. An exemplary embodiment of a method for utilizing an ultrasonic meter including an acoustic is provided below with reference to FIG. 4.

Using only 1 pair of transducers would allow the rail to "zero" the meter. The zeroing of a meter is typically done at zero-flow. This allows any transit time difference between upstream and downstream that occurs independent of the fluid flow 156 to be calibrated out. However, typically, the upstream minus downstream transit time difference through the fluid at zero flow is the same as the transit time difference through the pipe wall or through the rail, regardless of flow in the pipe. Taking the zero-flow point through the pipe wall or rail will allow the meter to be zero flow calibrated while there is flow in the pipe.

Figure 2B:
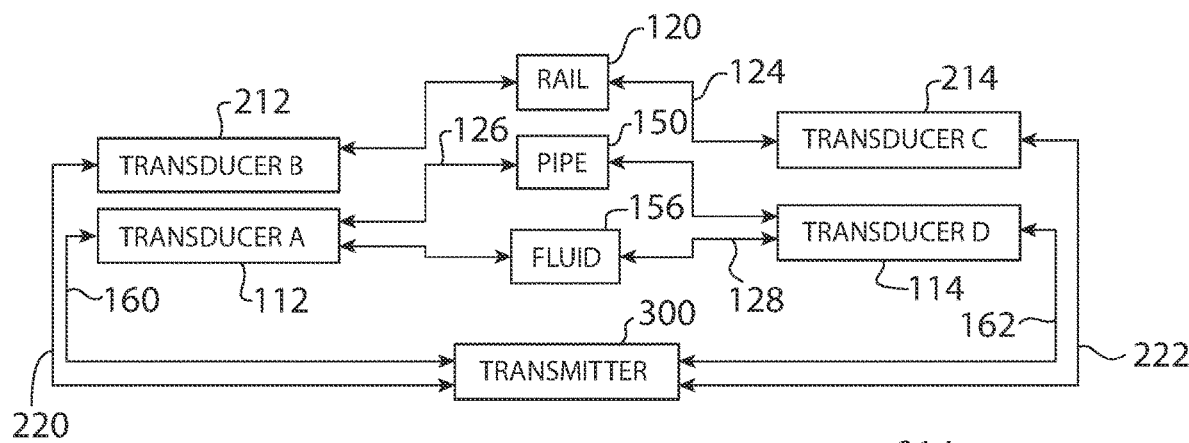
FIGS. 2A and 2B are a simplified illustration of an alternative embodiment of an ultrasonic flow meter assembly, shown in a cross-section view, and a communication map for the assembly, according to an alternative embodiment.
Figure 2A:
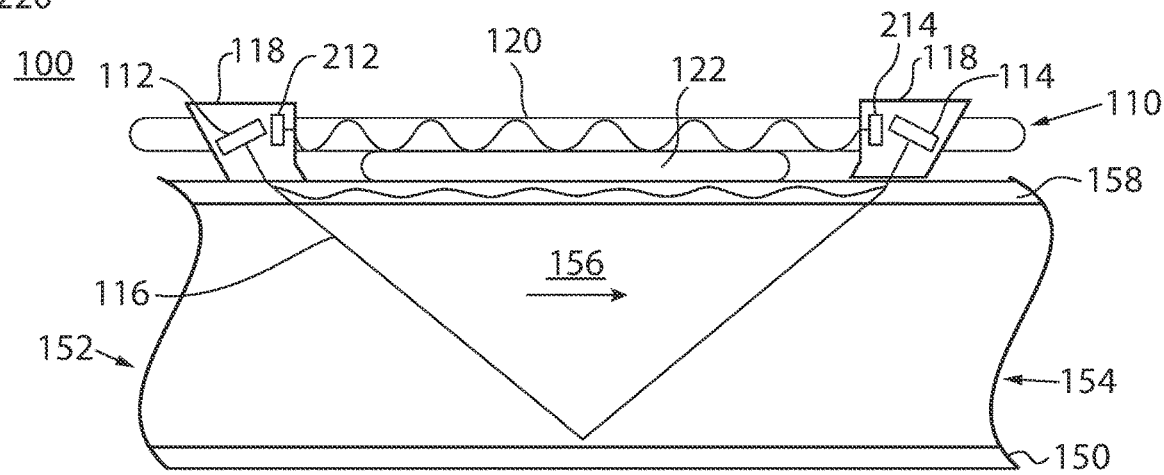

Referring next to FIG. 2A, a simplified illustration of an ultrasonic flow meter assembly 100 is shown in a cross-section view, according to an alternative embodiment. The ultrasonic flow meter assembly 100 includes an ultrasonic flow meter 110, a conduit 150, and a flow measurement computer 500. In the additional embodiment shown in FIG. 2A, ultrasonic flow meter includes a third transducer 212 and a fourth transducer 214.

In the alternative embodiment shown in FIG. 2A, and similar to FIG. 1A, first transducer 112 is connected to flow measurement computer 300 by a first transducer cable 160. Second transducer 114 is connected to flow measurement computer 300 by a second transducer cable 162. Transducer cables 160 and 162 may be any type of cabling configured to facilitate sending and receiving electronic signals between first and second transducers 112 and 114 and flow measurement computer 300. However, third transducer 212 is connected to flow measurement computer 300 by a third transducer cable 220. Fourth transducer 214 is connected to flow measurement computer 300 by a fourth transducer cable 222. Transducer cables 220 and 222 may be any type of cabling configured to facilitate sending and receiving electronic signals between third and fourth transducers 112 and 114 along the acoustic rail 120 and flow measurement computer 300.

Referring now also to FIG. 2B, acoustic rail 120 is configured to receive an acoustic rail signal 124 transmitted between third transducer 212 and fourth transducer 214 in forward and reverse direction along acoustic rail 120 concurrently with transmission between first transducer 112 and second transducer 114 in forward and reverse direction through the fluid flow 156. The acoustic rail signal 124 is sent sequentially, alternating upstream and downstream. One transducer is set to "listen" while the other transmits. The flow measurement computer 300 can distinguish between fluid wave, conduit wave, and rail wave based on the timing of acoustic signal receipt and the transducer receiving the acoustic signal.

Advantageously, this embodiment allows the acoustic rail signal to be received without overlapping the conduit wall signal and the fluid signal. Such an overlap may present a problem on smaller conduits or conduits with similar Speed of Sound to the acoustic rail Speed of Sound.

Figure 3:
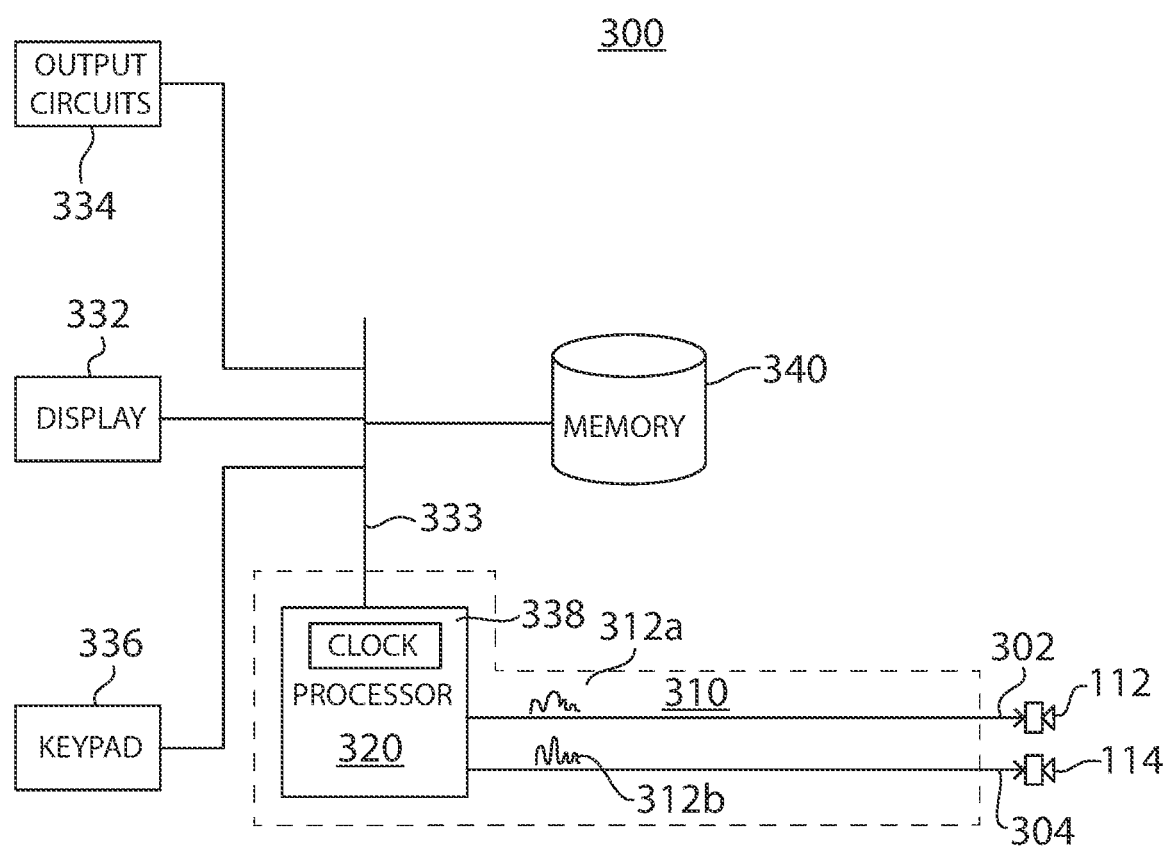
FIG. 3 is an illustration of a system for ultrasonic flow measurement utilizing an acoustic rail, according to an exemplary embodiment.

Referring next to FIG. 3, flow meter circuitry 300 and components are illustrated in block form, according to an exemplary embodiment. A transit time circuit board 310 includes a programmable processor 320 which also receives the transit time measurements to calculate flow signals for display 332 and for other output circuits 334, and to perform other calculations and analyses of the measurements, as will appear. A keypad 336 provides for user input, to select display parameters, set periodic auto zeroing, etc. for example. A memory 340 is any type of non-transient memory configured to store data. The components of flow meter circuitry 300 may be interconnected for communication through a communication bus 333. One of ordinary skill in the art should understand that the components described herein are exemplary and different components or a different arrangement of components may be used to achieve the functionality described herein.

The transit time circuit board 310 is a printed circuit board (PCB) and comprises the programmable processor 320. Programmable processor 320 conducts acoustic rail transit time measurements, conduit wall transit time measurements and transit time flow measurements for calculation of the flow measurements. Programmable processor 320 is connected through communication cables 302, 304 with transducers 112, 114. In the embodiment shown in FIG. 1B, a separate connection using communication cables 302, 304 is provided between the processor and each transducer pair.

Programmable processor 320 measures transit times. Specifically, a transit time measurement is initiated by a wave 312a from programmable processor 320 which is connected with the transmitting transducer, shown as transducer 112 in FIG. 1A. The acoustic signal 312a may be a modulated sign wave, a square wave, etc. that excites a piezo transducer in the transmitting transducer to generate a sinusoidal burst. The received signal 312b is produced by the receiving transducer, shown as transducer 114 in FIG. 1A, to an input of programmable processor 320. After several signal waves are transmitted downstream from transducer 112 to transducer 114, a like number of signal waves are transmitted upstream from transducer 114 to transducer 112. Programmable processor 320 measures the upstream and downstream travel times and provides this information to processor 320. The processor 320 utilizes these travel times to calculate an $\Delta T$. Three travel times for the rail, conduit, and fluid are used to generate three $\Delta T$ are in turn used in the calculations of conduit spacing, temperature, and fluid speed as described below.

Clock 338 provides time signals to processor 320. Outputs from programmable processor 320 are provided to display 332 showing flow rate and total flow, and/or to other output circuits 334 which might include a transmitter to a remote display, a recorder, or the like. Keypad 336 may be used to select display parameters, as milliliters per minute or gallons per hour, for example.

Figure 4:
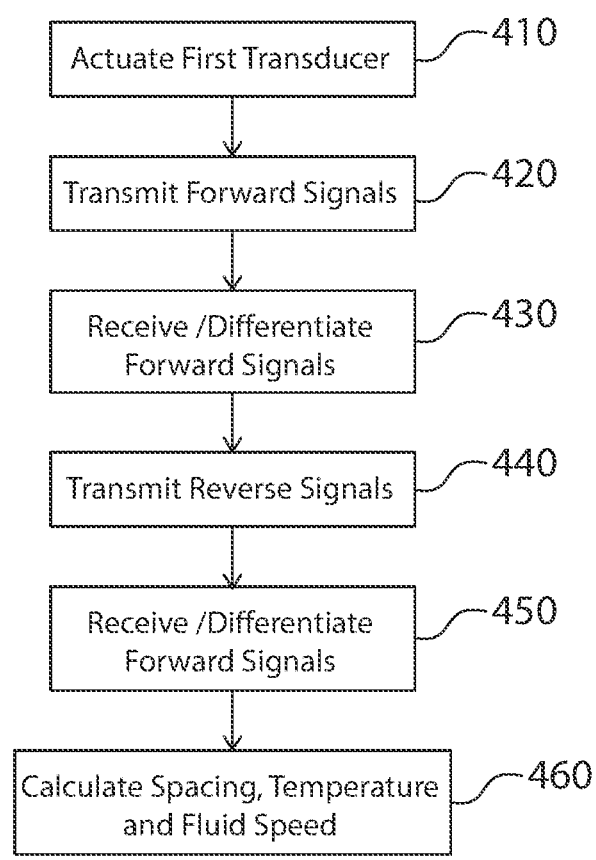
FIG. 4 is a flow chart illustrating a method for performing ultrasonic fluid measurement using an acoustic rail measurement, according to an exemplary embodiment.

Referring now to FIG. 4, a flowchart 400 illustrating a method for performing ultrasonic fluid measurement using an acoustic rail measurement is shown, according to an exemplary embodiment. The method may be implemented by a computer processor 320 of the flow measurement computer 300 and/or one or more independent data stores. The computer system implementing the method may include a processor configured to implement a computer program stored in nonvolatile memory to implement the functionality described herein.

In a first step 410, flow measurement computer 300 sends out a voltage to first transducer 112 to initiate flow measurement. Typically, flow measurements are performed using different frequency transducers for different conduits. Longer wavelengths penetrate larger conduits better while shorter wavelengths can be more accurate.

In a second step 420, first transducer 112 emits an ultrasonic sound which enters the acoustic rail 120, the conduit wall 158, and the fluid flow 156. Thus, the signal splits into 3 parts as it propagates; the acoustic rail signal 124, the conduit wall signal 126, and the fluid signal 128. These 3 distinct waves travel through their distinct paths in the acoustic rail 120, the conduit wall 158, and the fluid flow 156, respectively.

In a third step 430, the propagated signals are received by the second transducer 114. Second transducer 114 transduces the sound into a voltage which is received and interpreted by flow measurement computer 300 as three forward travel times (forward times of flight). This process is then performed in reverse by flow measurement computer 300 in steps 440 and 450 sending a voltage to second transducer 114, which emits an ultrasonic sound which enters the acoustic rail 120, conduit wall 158, and fluid flow 156 and is received by first transducer 112. First transducer 112 transduces the sound into a voltage which is received and interpreted by flow measurement computer 300 as three reverse travel times (backward times of flight).

In a step 460, the three travel times for the rail, conduit, and fluid are used in the calculations of conduit spacing, temperature, and fluid speed. If a conduit is made of carbon steel and the acoustic rail 120 includes a core of fluid as a signal path, flow measurement computer 300 can determine the spacing and temperature of the system. In one exemplary scenario, the meter could yield the following measured transit times: the time of flight or transit time in fluid passing through the conduit (ConduitFluid_ToF)=0.00010594 seconds, the time of flight in the conduit wall (Conduit_ToF)=0.00002716 seconds. Where the conduit is formed from carbon steel, it is known that the speed of sound in carbon steel does not depend on temperature, but remains constant at 233796 in/sec. Therefore, the distance between transducers can be calculated from these values as: Transducer_Dist=Conduit_ToF*the conduit speed of sound (Conduit_SoS)=233796 in/sec*0.00002716 sec=6.35 inches. At this spacing, the speed of sound through the fluid in the acoustic rail (RailFluid_SoS) can be calculated as follows: ConduitFluid_SoS=Transducer_Dist/ RailFluid_ToF=6.35 inches/0.00010594 seconds=59940 inches/sec. This speed of sound in this fluid corresponds to a temperature of 100.0° F.

Conduit_ToF=Transducer_Dist/Conduit_SoS
Rail_ToF=Transducer_Dist/Rail_SoS
Conduit_SoS=Function of Temperature_Conduit
Rail_SoS=Function of Temperature_Rail By assuming the temperature of the conduit and the temperature of the rail are the same, solving these equations simultaneously will give the transducer spacing and the temperature of the system. To have rail and conduit be at the same temperature as the fluid, an insulation layer may be required. As this design is applicable to any diameter conduit, the insulation can be either an enclosure or an insulating wrap which will cover the conduit and the transducers and rail.

Figure 5:
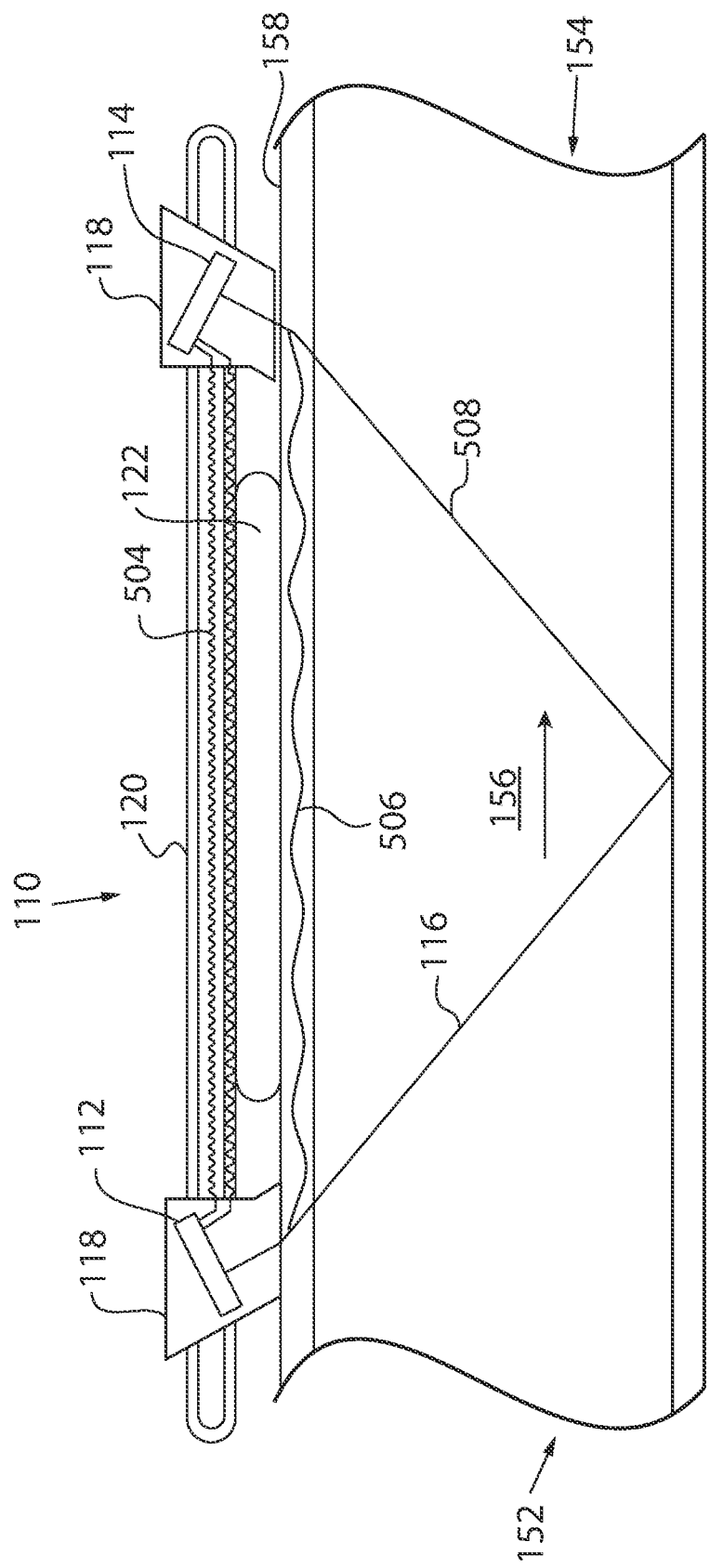
FIG. 5 is a simplified illustration of an ultrasonic flow meter assembly, shown in a cross-section view, according to an alternative embodiment.

Referring now to FIG. 5, a simplified illustration of an ultrasonic flow meter assembly 100 is shown in a cross-section view, according to an alternative embodiment. The ultrasonic flow meter assembly 100 includes an ultrasonic flow meter 110, a conduit 150, and a flow measurement computer 500. In the embodiment shown in FIG. 5, acoustic rail 120 is composed of at least two different materials and defines at least two acoustic signal paths through the acoustic rail 120.

In the alternative embodiment shown in FIG. 5, and similar to FIG. 1A, first transducer 112 is connected to flow measurement computer 300 by a first transducer cable 160. Second transducer 114 is connected to flow measurement computer 300 by a second transducer cable 162. Transducer cables 160 and 162 may be any type of cabling configured to facilitate sending and receiving electronic signals between first and second transducers 112 and 114 and flow measurement computer 300.

In the embodiment shown in FIG. 5, acoustic rail 120 is configured to receive both first acoustic rail signal 502 and second acoustic rail signal 504, transmitted between first transducer 112 and second transducer 114 in forward and reverse direction along acoustic rail 120 along two separate acoustic signal paths, in addition to conduit wall signal 506 and fluid flow signal 508. The acoustic rail signal 124 is sent sequentially, alternating upstream and downstream. One transducer is set to "listen" while the other transmits. The flow measurement computer 300 can distinguish between the fluid wave, conduit wave, and first and second acoustic rail signals based on the timing of acoustic signal receipt, known properties of the acoustic rail materials, and the transducer timing for receiving the acoustic signal.

Advantageously, this embodiment provides two improvements over the existing design. Multiple materials of known speeds of sound in acoustic rail 120 will yield two signals 502 and 504 and associated transit times. The two values yield a more accurate distance measurement since the calculations can be performed twice on one Transit Time measurement. Flow measurement computer 300 is also configurable to use the 2nd rail signal 502 instead of a conduit signal 506 to reduce the impact of assumptions and/or inconsistencies in the conduit wall 158.

Further, flow meter calibration or zeroing can also be performed using only the first acoustic rail signals with no input from the conduit wall signal or the wave from the 2nd material in a two-material rail. Where the processor determines that the conduit wall is not being received at the second transducer and determines that the signal through the rail or the fluid is superior to the conduit wall signal, this flexibility provides an advantage because and accurate calibration can still be performed.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. An ultrasonic flow meter configured to measure a flow within a conduit, comprising:
   first and second transducers configured to transmit acoustic signals in forward and reverse direction as fluid flow signals along a fluid flow signal path through a fluid within the conduit;
   an acoustic rail extending between the first and second transducers configured to receive the transmitted acoustic signals for transmission as acoustic rail signals in forward and reverse direction along an acoustic rail signal path along the acoustic rail;
   a printed circuit board including circuitry for conducting ultrasonic transit time flow measurements; and
   a programmable processor included on the printed circuit board that is configured to generate flow measurement data using the fluid flow signals and the acoustic rail signals,
   wherein the acoustic rail is isolated from the conduit.

2. The flow meter of claim 1, wherein the first and second transducers are further configured to transmit acoustic signals in forward and reverse direction as conduit wall signals along a conduit signal path through a wall of the conduit.

3. The flow meter of claim 2, wherein the programmable processor is configured to generate flow measurement data using the fluid flow signals, the conduit wall signals and the acoustic rail signals.

4. The flow meter of claim 2, wherein the programmable processor is configured to calibrate the flow meter using the acoustic rail signal, the conduit wall signal and the fluid flow signal.

5. The flow meter of claim 4, wherein the programmable processor is configured to monitor the flow rate to identify a steady, non-zero flow rate prior to initiating flow meter calibration.

6. The flow meter of claim 1, wherein the acoustic rail is configured to include at least two different materials, each material defining a separate acoustic rail signal path.

7. The flow meter of claim 1, wherein the acoustic rail includes a rail wall filled with fluid.

8. The flow meter of claim 7, wherein the fluid is water.

9. The flow meter of claim 8, wherein the water has been treated with at least one of an anti-freezing agent, a preservative agent, and a antibacterial agent.

10. The flow meter of claim 1, wherein the acoustic rail is isolated from the conduit by an air gap.

11. The flow meter of claim 1, wherein the acoustic rail is isolated from the conduit by a dampener providing acoustic and temperature isolation.

12. The flow meter of claim 1, wherein a length of the acoustic rail is greater than a distance between the first and second transducers.

13. The computer-implemented method of claim 12, wherein the acoustic rail is isolated from the conduit by a dampener providing acoustic and temperature isolation.

14. A computer-implemented method for measuring a flow within a conduit using an ultrasonic flow meter, comprising:

transmitting acoustic signals in forward and reverse direction as fluid flow signals along a fluid flow signal path through a fluid within the conduit using a first and a second transducer;

transmitting acoustic signals for transmission as acoustic rail signals in forward and reverse direction along an acoustic rail signal path along an acoustic rail extending between the first and second transducers;

conducting ultrasonic transit time flow measurements at a printed circuit board including circuitry, and generating flow measurement data using the fluid flow signals and the acoustic rail signals at a programmable processor included on the printed circuit board, wherein the acoustic rail is isolated from the conduit.

15. The computer-implemented method of claim 14, wherein the first and second transducers are further configured to transmit acoustic signals in forward and reverse direction as conduit wall signals along a conduit signal path through a wall of the conduit.

16. The computer-implemented method of claim 14, wherein the programmable processor is configured to generate flow measurement data using the fluid flow signals, the conduit wall signals and the acoustic rail signals.

17. The computer-implemented method of claim 14, wherein the acoustic rail is configured to include at least two different materials, each material defining a separate acoustic rail signal path.

18. The computer-implemented method of claim 14, wherein the acoustic rail includes a rail wall filled with water.

19. The computer-implemented method of claim 18, wherein the water has been treated with at least one of an anti-freezing agent, a preservative agent, and a antibacterial agent.

20. The computer-implemented method of claim 14, wherein the acoustic rail is isolated from the conduit by an air gap.

\* \* \* \* \*